(12) United States Patent
Bessho et al.

(10) Patent No.: US 11,998,085 B2
(45) Date of Patent: Jun. 4, 2024

(54) SHOE AND METHOD FOR PRODUCING SHOE

(71) Applicant: ASICS CORPORATION, Kobe (JP)

(72) Inventors: Ayu Bessho, Kobe (JP); Satoru Abe, Kobe (JP); Norihiko Taniguchi, Kobe (JP)

(73) Assignee: ASICS CORPORATION, Kobe (JP)

( * ) Notice: Subject to any disclaimer, the term of this patent is extended or adjusted under 35 U.S.C. 154(b) by 576 days.

(21) Appl. No.: 16/999,963

(22) Filed: Aug. 21, 2020

(65) Prior Publication Data
US 2021/0052033 A1    Feb. 25, 2021

(30) Foreign Application Priority Data
Aug. 22, 2019 (JP) .................. 2019-151956

(51) Int. Cl.
| | |
|---|---|
| *A43B 9/02* | (2006.01) |
| *A43B 1/04* | (2022.01) |
| *A43B 23/02* | (2006.01) |
| *B32B 3/18* | (2006.01) |
| *B32B 5/06* | (2006.01) |
| *B32B 5/26* | (2006.01) |
| *B32B 7/028* | (2019.01) |
| *B32B 37/00* | (2006.01) |

(52) U.S. Cl.
CPC .................. *A43B 9/02* (2013.01); *A43B 1/04* (2013.01); *A43B 23/0235* (2013.01); *A43B 23/025* (2013.01); *A43B 23/0295* (2013.01); *B32B 3/18* (2013.01); *B32B 5/06* (2013.01); *B32B 5/26* (2013.01); *B32B 7/028* (2019.01); *B32B 37/00* (2013.01); *B32B 2307/736* (2013.01); *B32B 2437/02* (2013.01)

(58) Field of Classification Search
CPC ......... A43B 9/02; A43B 23/0235; B32B 3/18; B32B 5/06; B32B 5/26; B32B 2307/736; B32B 3/16
See application file for complete search history.

(56) References Cited

U.S. PATENT DOCUMENTS

| | | |
|---|---|---|
| 9,185,947 B2 | 11/2015 | Spencer et al. |
| 2002/0012784 A1 | 1/2002 | Norton et al. |

(Continued)

FOREIGN PATENT DOCUMENTS

| | | |
|---|---|---|
| JP | S18-004312 Y | 4/1943 |
| JP | 2002-537878 A | 11/2002 |

(Continued)

OTHER PUBLICATIONS

Communication pursuant to Article 94(3) EPC issued by the European Patent Office on Jan. 3, 2022, which corresponds to European Patent Application No. 20 192 209.3-1005 and is related to U.S. Appl. No. 16/999,963.

(Continued)

*Primary Examiner* — Elizabeth M Imani
(74) *Attorney, Agent, or Firm* — Studebaker & Brackett PC

(57) ABSTRACT

Provided is a shoe including an upper composed of a fiber sheet, the fiber sheet including: a base sheet including yarns having heat shrinkability; and a plurality of chip members, each of which is a sheet having an area smaller than that of the base sheet, the base sheet and the plurality of chip members being layered and joined together.

10 Claims, 15 Drawing Sheets

(56) References Cited

U.S. PATENT DOCUMENTS

| | | |
|---|---|---|
| 2002/0071946 A1 | 6/2002 | Norton et al. |
| 2004/0087230 A1* | 5/2004 | Wildeman ............ A43B 23/026 |
| | | 428/196 |
| 2012/0297642 A1 | 11/2012 | Schaefer et al. |
| 2012/0297643 A1 | 11/2012 | Shaffer et al. |
| 2013/0131853 A1 | 5/2013 | Regan et al. |
| 2013/0312284 A1 | 11/2013 | Berend et al. |
| 2014/0082905 A1* | 3/2014 | Wen ....................... D04B 21/16 |
| | | 28/165 |
| 2016/0316859 A1 | 11/2016 | Regan et al. |
| 2017/0066212 A1 | 3/2017 | de Backer |
| 2018/0103724 A1 | 4/2018 | Ho |
| 2019/0078245 A1 | 3/2019 | Dua et al. |
| 2019/0366680 A1 | 12/2019 | Dua et al. |
| 2019/0387831 A1 | 12/2019 | Dua et al. |
| 2019/0387839 A1* | 12/2019 | Dua ........................ B32B 5/06 |
| 2020/0253332 A1 | 8/2020 | Shaffer et al. |

FOREIGN PATENT DOCUMENTS

| | | |
|---|---|---|
| JP | 2015-534876 A | 12/2015 |
| JP | 2017-094056 A | 6/2017 |
| JP | 2018-532461 A | 11/2018 |
| WO | 2018/144122 A1 | 8/2018 |

OTHER PUBLICATIONS

The extended European search report issued by the European Patent Office on Nov. 24, 2020, which corresponds to European Patent Application No. 20192209.3-1011 and is related to U.S. Appl. No. 16/999,963.

An Office Action; "Notice of Reasons for Refusal," mailed by the Japanese Patent Office on Jun. 3, 2022, which corresponds to Japanese Patent Application No. 2019-151956 and is related to U.S. Appl. No. 16/999,963; with English language translation.

An Office Action mailed by China National Intellectual Property Administration on Jun. 8, 2023, which corresponds to Chinese Patent Application No. 202010842065.6 and is related to U.S. Appl. No. 16/999,963; with English language translation.

\* cited by examiner

SHOE AND METHOD FOR PRODUCING SHOE

CROSS-REFERENCE TO RELATED APPLICATION

This application claims priority to Japanese Patent Application No. 2019-151956, filed on Aug. 22, 2019, the disclosure of which is incorporated herein by reference in its entirety.

FIELD OF THE INVENTION

The present invention relates to a shoe including an upper made of a fabric, and a method for producing the shoe.

BACKGROUND OF THE INVENTION

Various proposals have been conventionally made for producing an upper. For example, U.S. Pat. No. 9,185,947 B discloses creating an upper using a recycled material. US 2019/078245 A discloses an upper for footwear using a non-woven textile partially having fused regions, which have been subjected to heat in order to change the characteristics of those fused regions. US 2018/103724 A discloses a shoe upper using a non-woven fabric.

The force applied to a shoe by its wearer's foot during his or her motion varies by portion of the shoe. In addition, various design selections are made for different portions of the shoe for design purposes. It has therefore been demanded to easily impart different characteristics to different portions of an upper. However, this is disclosed by none of the aforementioned cited documents. U.S. Pat. No. 9,185,947 B or US 2018/103724 A discloses the shoe upper having the same characteristics across the entire area. The shoe disclosed in US 2019/078245 A can have different characteristics between the fused regions and other regions, but can have only two kinds of characteristics and has the positions of the fused regions determined at the stage where the non-woven textile is made. Such a shoe has low flexibility to change characteristics depending on the portions of the upper.

SUMMARY OF THE INVENTION

Technical Problem

It is therefore an object of the present invention to provide a shoe including an upper configured to enable respective portions of the upper to be easily imparted with different characteristics from each other.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

Solution to Problem

The present invention provides a shoe including an upper composed of a fiber sheet, the fiber sheet including: a base sheet including yarns having heat shrinkability; and a plurality of chip members, each of which is a sheet having an area smaller than that of the base sheet, the base sheet and the plurality of chip members being layered and joined together.

The present invention also provides a method for producing a shoe, the method including: arranging a plurality of chip members on at least one side of a base sheet including yarns having heat shrinkability, wherein each of the plurality of chip members is a sheet having an area smaller than that of the base sheet; integrating the base sheet and the plurality of chip members by needle punching to form a fiber sheet; producing an unshaped upper by cutting the fiber sheet into a shape of an upper and processing the cut fiber sheet into such a shape for placement of the cut fiber sheet on a last, followed by placing the unshaped upper on the last; and obtaining a shaped upper by heating the unshaped upper in conformity with the shape of the last.

BRIEF DESCRIPTION OF DRAWINGS

The foregoing and other features of the present invention will become apparent from the following description and drawings of an illustrative embodiment of the invention in which.

DETAILED DESCRIPTION OF THE PREFERRED EMBODIMENT

Figure 1:
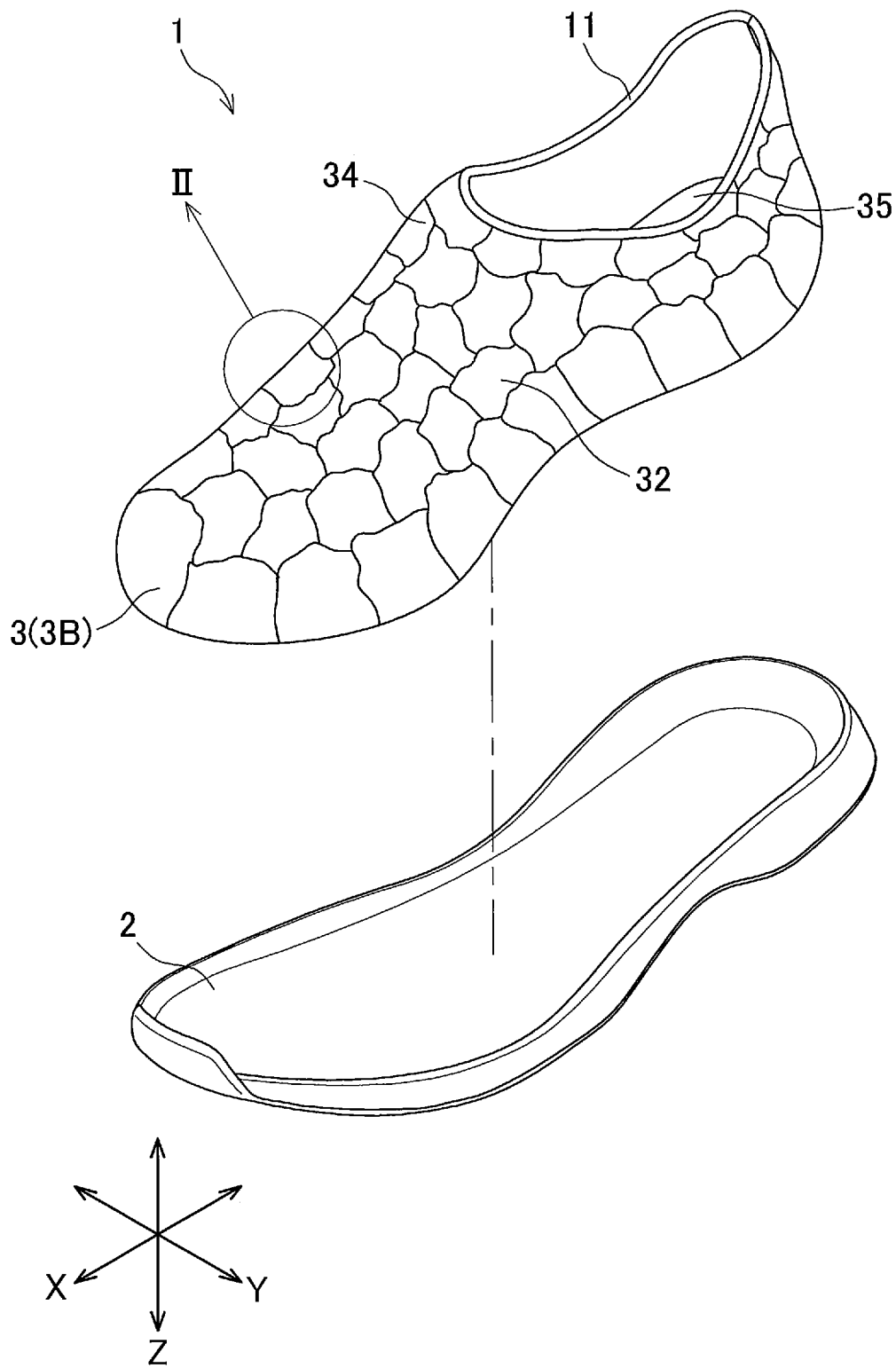
FIG. 1 is an exploded perspective view showing a sole and an upper of a shoe according to one embodiment of the present invention.
Figure 2:
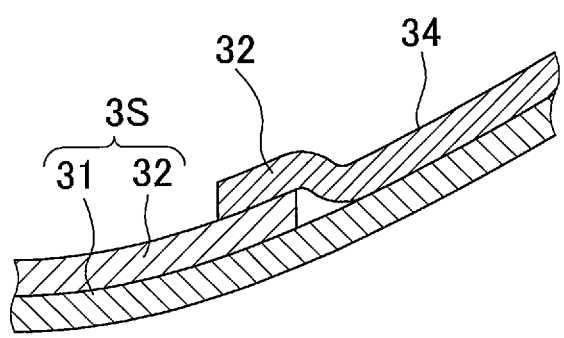
FIG. 2 is a cross-sectional view showing an example of a layer structure of a body part of the upper in a portion surrounded by a circle II in FIG. 1.
Figure 3:
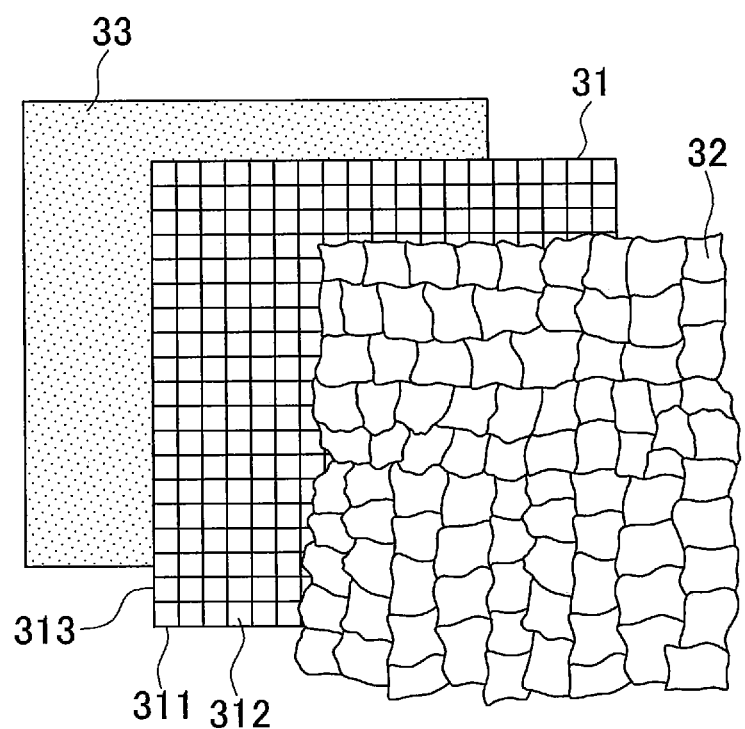
FIG. 3 is a schematic view showing a state where a base sheet composed of a woven fabric is sandwiched between a sheet of a non-woven fabric and an aggregate of a plurality of chip members each composed of a non-woven fabric.

An embodiment of the present invention will be exemplified with reference to the drawings. As shown in FIG. 1, a shoe 1 of this embodiment mainly includes a sole 2 and an upper 3, the upper 3 being attached to the sole 2. The upper 3 includes at least a two-layered structure, and as shown in FIG. 2 and FIG. 3, includes a sheet-shaped base sheet 31, and a plurality of sheet-shaped chip members 32 formed into an aggregate and layered on the base sheet 31. When a description is given below on an upper 3 in the course of production (before and after being shaped), the upper 3 before being shaped can be referred to as an unshaped upper 3A while the upper 3 after being shaped can be referred to as a shaped upper 3B for separate identification of the respective states.

The base sheet 31 includes yarns 311 having heat shrinkability. The base sheet 31 is composed of a knitted fabric or a woven fabric having inner gaps 312. A knitting method for the knitted fabric is not particularly limited, but can be, for example, Raschel knitted or tricot knitted. A weaving method for the woven fabric is not particularly limited either, but can be, for example, plain-woven or twill-woven.

The "inner gaps" herein refer to spaces each present between fibers of yarns forming the knitted fabric or the woven fabric, or between aggregates of fibers. Generally, in the case where the fibers in the knitted fabric or the woven fabric are arranged to extend in a plane direction, the inner gaps are spaces extending through the plane in a normal direction, or spaces divided in the plane direction. In the case where adjacent fiber intersections are held away from each other, the inner gaps are spaces each surrounded by a plurality of fiber intersections. In the case where fusible yarns are used as will be described later, the fiber intersections after being fused by thermoforming of the upper 3 (unshaped upper 3A) are brought into a fixed state, thereby fixing the crossing fibers (yarns) to each other. The "inner gaps" correspond to, for example, mesh openings (see the inner gaps 312 defined by wefts 311 and warps 313 of the base sheet 31, which is shown as a second sheet of layered sheets in FIG. 3), or seam openings of a fabric. In this embodiment, the distances between adjacent fiber intersections are set to 1 to 5 mm. Alternatively, the space ratio of the knitted fabric or the woven fabric in the plane direction is set to 15 to 30%. Either of the aforementioned two conditions can be satisfied.

Figure 4A:
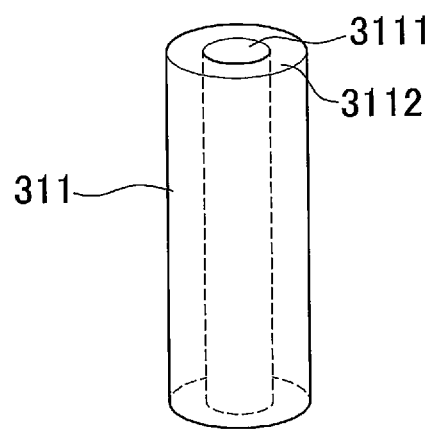
FIG. 4A is a schematic perspective view showing a configuration of a yarn composed of a core-sheath material.
Figure 4B:
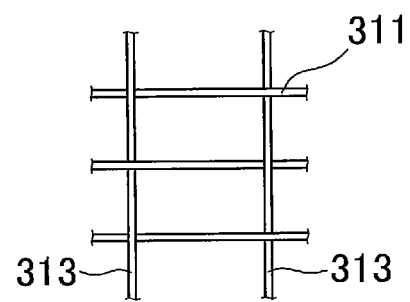
FIG. 4B shows the original state of the woven fabric.

Since the base sheet 31 has the inner gaps 312, the spaces as the inner gaps 312 absorb deformation (shrinkage) of the heat-shrinkable yarns 311 and resulting movement of the crossing yarns 313 (see FIG. 4B). Thus, the aforementioned spaces do not restrict the deformation of the base sheet 31 caused by the heat-shrinkable yarns 311. This configuration enables the base sheet 31 to be deformed as designed, and thus allows the conditions for heat shrinkage (e.g., heating temperature and heating time) to be easily determined.

As schematically shown in FIG. 4A, the heat-shrinkable yarns 311 included in the base sheet 31 can be composed of a core-sheath material including a core 3111 (inner circumferential portion) and a sheath 3112 (outer circumferential portion) that are integrally formed. The yarns 311 are fusible yarns that are thermally fused together and have different melting points between the core 3111 and the sheath 3112. In the yarns 311, the sheath 3112 has a lower melting point than that of the core 3111. This configuration allows the yarns 311 to entirely shrink and allows only the sheath 3112 to melt when the unshaped upper 3A is subjected to heat at the time of shaping the upper 3. Thus, both the shape retaining action by the sheath 3112 and the elastic action by the core 3111 can be achieved. Examples of the heat-shrinkable yarns 311 include, a core-sheath material composed of yarns including a polyester resin, more specifically a polyester-based thermoplastic elastomer, and a core-sheath material including the core 3111 composed of a polyester-based thermoplastic elastomer and the sheath 3112 composed of a polyamide-based thermoplastic elastomer.

Figure 4C:
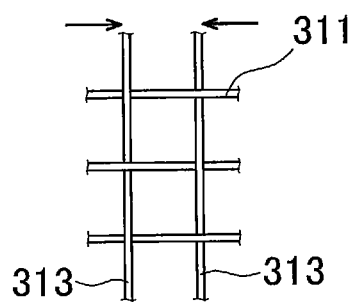
FIG. 4C schematically shows a state where wefts have shrunk.
Figure 4D:
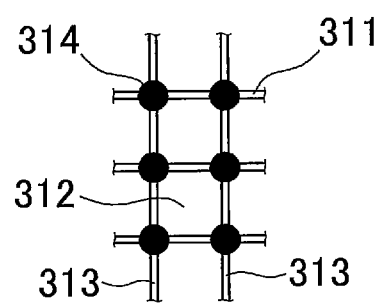
FIG. 4D schematically shows a state where warps and wefts have been fused with each other.

The base sheet 31 can be constituted by a woven fabric including warps and wefts either of which are composed of the heat-shrinkable yarns 311, or by a knitted fabric including 10% or more of the heat-shrinkable yarns 311 to the total yarns 311 constituting the knitted fabric. For the woven fabric, the heat-shrinkable yarns 311 (warps or wefts) are arranged along a width direction Y (i.e., a short direction in plan view; see FIG. 1) of the upper 3. The width direction Y is a horizontal direction and a direction orthogonal to a front and back direction X (i.e., a longitudinal direction in plan view; see FIG. 1). As of the filing date of the present application, it is (technically) general to use the heat-shrinkable yarns 311 as wefts. Accordingly, FIG. 4B shows a configuration of the woven fabric as the base sheet 31 in which the heat-shrinkable yarns 311 are used as the wefts. According to this configuration, heating of the base sheet 31 causes the wefts 311 to shrink in the length direction, as shown in FIG. 4C (the shrinkage in the arrowed direction reduces the distance between two adjacent warps 313). The sheaths 3112 of the yarns 311 composed of the core-sheath material are fused and fixed to the warps 313 (the fixed portions 314 shown with black dots in FIG. 4D). The base sheet 31 is thus deformed. Use of the deformation enables appropriate shaping of the upper 3, in order to form the upper 3 into a desired shape, more specifically in order to form the upper 3 in conformity with the shape of a shoe last 4.

Each of the plurality of chip members 32 is a sheet having an area smaller than that of the base sheet 31, and is in this embodiment composed of a non-woven fabric. The chip member 32 can be, for example, formed into a rectangular shape, a polygonal shape, a circular shape, or the like having a side or a diameter in the range of 10 mm to 50 mm. However, the size and shape (i.e., contour shape) of the chip member 32 are not limited to those as aforementioned. The non-woven fabric can include, for example, polyester fibers. The non-woven fabric of the chip member 32 is composed of tangled fibers, and thus has no inner gap corresponding to the inner gap 312 of the base sheet 31.

In the upper 3, the plurality of chip members 32 are arranged at least on an outer side of the base sheet 31 (i.e., on a side away from a wearer's foot when the shoe is worn; on the upper side in FIG. 2). That is, a layer constituted by the base sheet 31 is an inner layer, and a layer in which the plurality of chip members 32 are aggregated is an outer layer. This configuration allows the plurality of chip members 32 to be positioned in the outermost layer, in which case the appearance of the upper 3 is changeable by the chip members 32 appearing in the outermost layer.

Each of the plurality of chip members 32 is composed of a non-woven fabric made from a recycled material. The "recycled material" means a material such as an end material resulting from the production of shoes or other materials, or small pieces into which the uppers of used and discarded shoes are cut, that is, a material that has been made for a purpose different from forming the chips, a material which was not used for the purpose, or a material remaining after the purpose is achieved (i.e., after use of the material for the purpose is finished). Producing the shoe 1 using the recycled material can save resources and can consequently reduce the environmental load. The chip member 32 can be composed not only of the non-woven fabric but also of a knitted fabric or a woven fabric. Further, a chip member 32 composed of any of the non-woven fabric, the knitted fabric, and the woven fabric can be combined with a chip member 32 composed of a different material.

Figure 5:
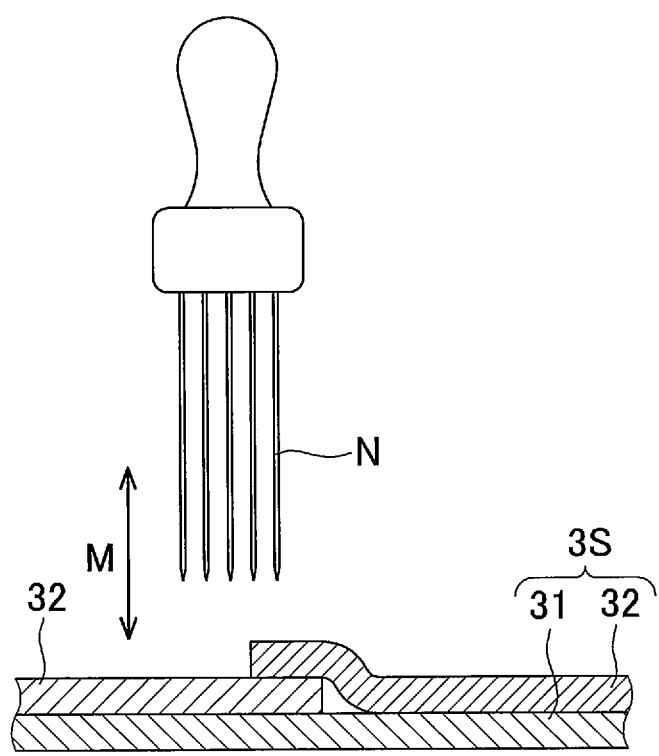
FIG. 5 is a schematic view of needle punching.

As shown in FIG. 5, a layer constituted by the base sheet 31 and a layer constituted by an aggregate of the plurality of chip members 32 are layered on each other and subjected to needle punching in which a needle punching device having one or more needles N is made to reciprocate in a direction M as in FIG. 5 to repeatedly punch the one or more needles into the layers, so that the base sheet 31 and the plurality of chip members 32 are integrally formed into a fiber sheet 3S. The combination of the base sheet 31 and the plurality of chip members 32 that constitute the fiber sheet 3S in terms of their materials may be any one of: a knitted fabric and a non-woven fabric; a woven fabric and a non-woven fabric; a knitted fabric and a woven fabric; and a woven fabric and a knitted fabric. Since the plurality of chip members 32 are used and different chip members 32 are joined to different portions of the base sheet 31, various characteristics can be imparted to the upper 3 depending on the portions of the upper 3. The "characteristics" herein include any parameters related to, for example, mechanical characteristics and appearance characteristics (e.g., contour shape, color, pattern, texture). The separate two layers, namely the layer composed of the base sheet 31 and the layer composed of the aggregate of the plurality of chip members 32, are integrally formed into the fiber sheet 3S so that the joint strength between the base member and the plurality of chip members 32 can be increased. Further, for example, the color combination between the base sheet 31 and the plurality of chip members 32, and the selection of positions of the fiber sheet 3S subjected to the needle punching can increase design flexibility of the fiber sheet 3S. The fiber sheet 3S is formed into, for example, a sheet shape (flat shape) or a bag shape, before being sewn to form the unshaped upper A corresponding to the upper 3. The "bag shape" herein refers to a three-dimensional shape in which an opening is arranged at a portion corresponding to a wearing opening 11 of the upper 3 and a portion serving as a bottom part 35 is in some cases formed. The sheet shape is a shape shown, as one example, in FIG. 6 and the bag shape is a shape shown, as one example, in FIG. 7.

As shown in FIG. 2, the plurality of chip members 32 partially overlap each other to be joined to the base sheet 31. This causes the plurality of chip members 32 to be exposed on a surface of the fiber sheet 3S, and thus does not cause the base sheet 31 itself to be exposed thereon (in the form of a sheet). The plurality of chip members 32 partially overlapping each other and located in the outermost layer can improve the appearance of the upper 3. Further, the plurality of chip members 32 overlapping each other support each other to be thereby stably joined to the base sheet 31.

Figure 8:
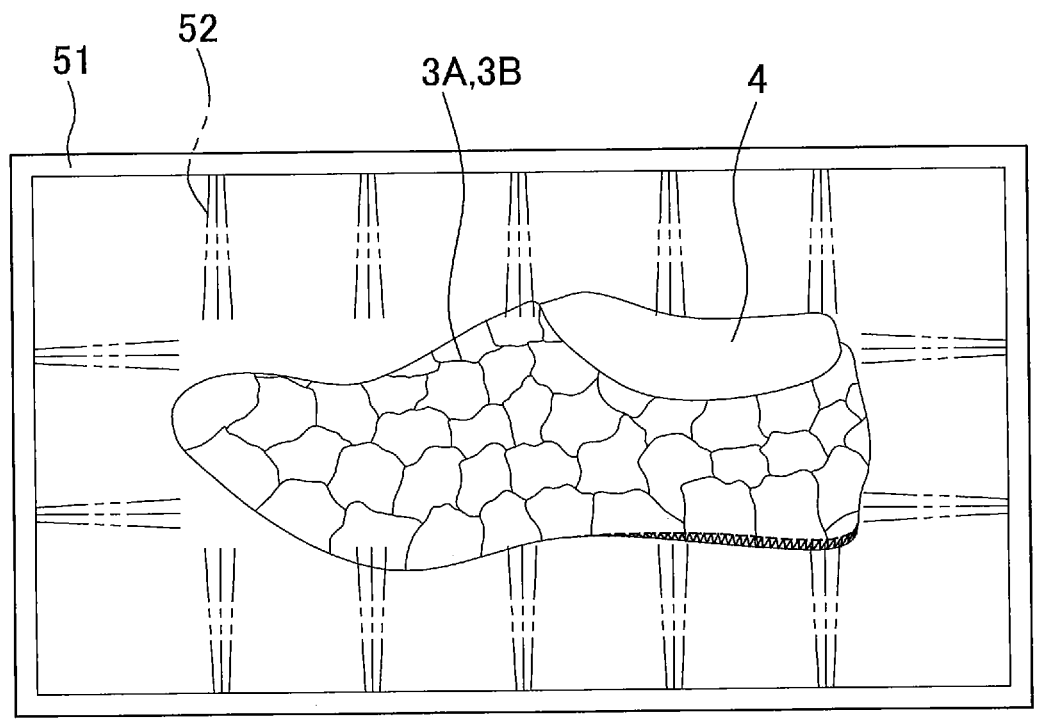
FIG. 8 is a side view showing a state where the unshaped upper is placed on a last and subjected to steam-heating in a heating box.

As aforementioned, the fiber sheet 3S includes the base sheet 31 including the heat-shrinkable yarns 311, and the base sheet 31 includes the inner gaps 312. When the upper 3 is shaped (thermoformed) by subjecting the fiber sheet 3S to heat for causing the base sheet 31 to shrink, as shown in FIG. 8, the fiber sheet 3S configured as above and constituting the upper 3 receives heat to be thereby deformed easily. Thus, the fiber sheet 3S is easily shaped in conformity with the shape (three-dimensional shape) of the last 4. The needle punching illustrated in FIG. 5 enables the base sheet 31 and the plurality of chip members 32 to be firmly integrated with each other. The inner gaps 312 in the base sheet 31 allow the needles N of the needle punching device to be easily punched into the base sheet 31, and thus enable the needle punching to be easily performed.

As described above, the fiber sheet 3S is easily shaped in conformity with the shape of the last 4. Such shaping can avoid forming a gap between, for example, a surface on a lateral side of the last 4 and the fiber sheet 3S, and thus allows the shoe wearer's foot to be less likely to move inside the shoe, thereby imparting excellent holding performance to the shoe. The shoe thus shaped gives comfortable wearing feeling to the wearer since there is no need to fill the gap with stuffing or a metal fitting.

Since the base sheet 31 is arranged inside the plurality of chip members 32, the base sheet 31 including the heat-shrinkable yarns 311 is located inside the fiber sheet 3S, which is close to the surface of the last 4 when the fiber sheet 3S is placed on the last 4. When the fiber sheet 3S is subjected to the thermoforming on the last 4, this configuration allows the base sheet 31 to be located close to the last 4 and thereby allows the fiber sheet 3S to be easily shaped in conformity with the last 4, as compared with the configuration in which the base sheet 31 is not arranged inside the plurality of chip members 32.

The configuration in which the base sheet 31 is arranged inside the plurality of chip members 32 has been herein exemplified. However, the inside and outside relationship between these layers is not limited thereto, and may be reversed, that is, the base sheet 31 may be arranged outside the plurality of chip members 32. The configuration may also be such that the plurality of chip members 32 are additionally positioned inside the base sheet 31 in this embodiment.

As shown in FIG. 3, the fiber sheet 3S may have a three-layered structure further including a sheet-shaped additional layer 33 composed of a non-woven fabric and arranged inside the base sheet 31. The additional layer 33 is also needle-punched into the base sheet 31 to thereby integrate together the three layers namely the base sheet 31, the plurality of chip members 32, and the additional layer 33. The additional layer 33 is not limited to the non-woven fabric, and may be composed of a knitted fabric, a woven fabric, or the like. The additional layer 33 may be constituted by the plurality of chip members 32. In this case, the additional layer 33 may be constituted by a combination of chip members 32 composed of any one of the non-woven fabric, the knitted fabric, and the woven fabric, and chip members 32 composed of a different material from the above. The additional layer 33 provided as aforementioned can give the shoe wearer an improved wearing feeling. Desired characteristics can be imparted to the produced shoe 1 by selecting the material and the thickness of the additional layer 33. The additional layer 33 can be entirely or partially provided on the base sheet 31. In the case of being partially provided, the additional layer 33 can be, for example, used for reinforcing a peripheral edge of the wearing opening 11 through which the wearer's foot is placed into and out of the shoe 1, or used for reinforcing a portion in which eyelets are arranged.

The upper 3 can include an upper body 34 located on an upper side in a vertical direction Z (see FIG. 1) in the state where the fiber sheet 3S has been sewn, and the bottom part 35 continuous with a lower peripheral end of the body part 34. The upper 3 can include the body part 34 only, without the bottom part 35. As will be described later, the produced bottom part 35 can be removed (i.e., separated from the body part 34) later on.

Next, a description will be given on a method for producing the shoe 1 including the upper 3 configured as above. This producing method mainly includes a chip member arrangement step, a joining step, a cutting step, a first shaping step, a second shaping step, and a sole attaching step. Any step other than the aforementioned steps can be added as appropriate.

Figure 6:
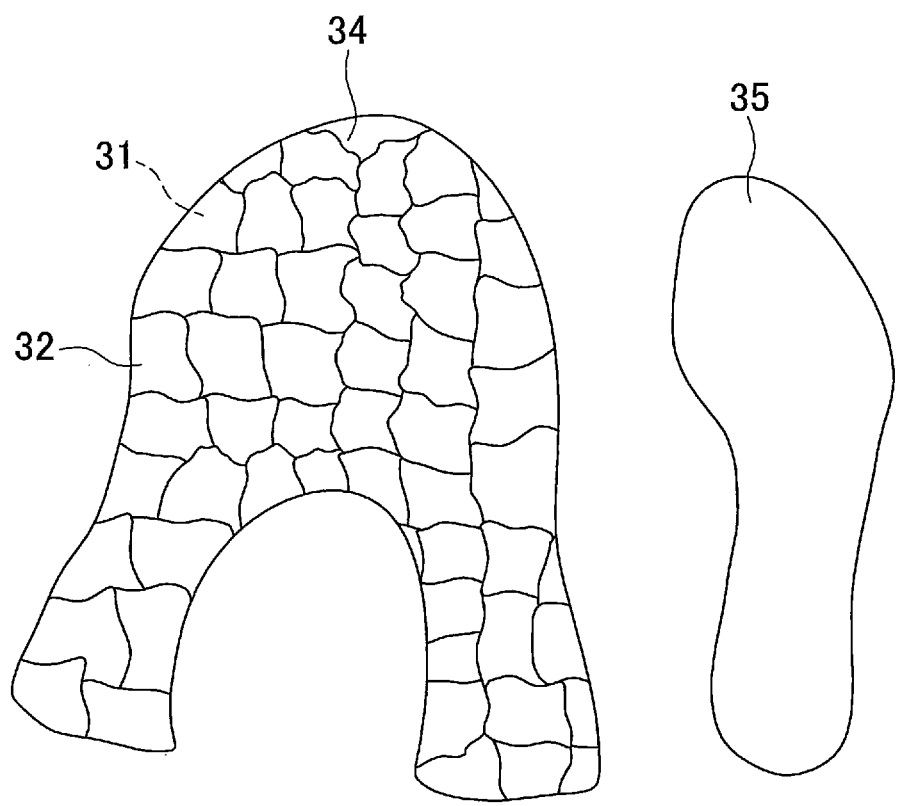
FIG. 6 is a plan view of the body part and a bottom part of the upper material in a state after a cutting step and a chip member arrangement step.
Figure 7:
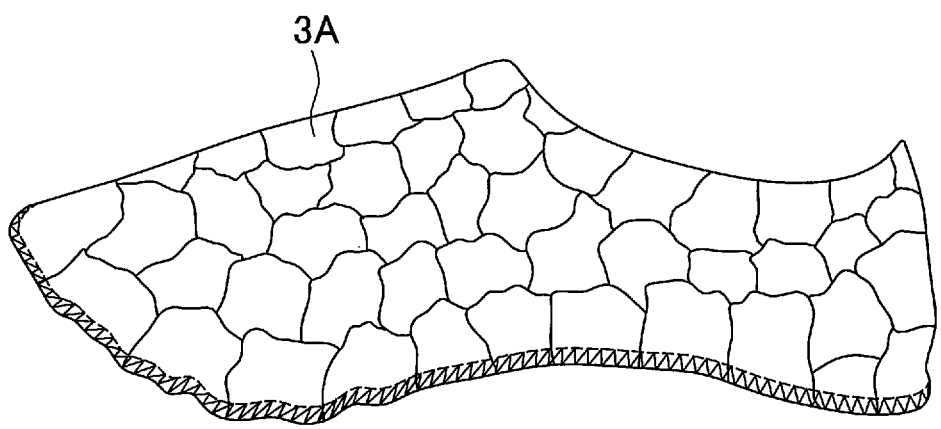
FIG. 7 is a side view showing an unshaped upper having the body part and the bottom part sewn together.

In the chip member arrangement step, as shown in FIG. 6, the plurality of chip members 32 are arranged on one side or both sides of the cut base sheet 31, that is, on at least one side thereof. In the joining step, the base sheet 31 and the plurality of chip members 32 are integrated together by needle-punching to make the fiber sheet 3S. In the cutting step, a sheet material of the base sheet 31 is cut into a specific size and form to obtain the shape in which the body part 34 and the bottom part 35 are developed. In this embodiment, the cutting step is performed after the chip member arrangement step and the joining step, but the cutting step may be performed before the chip member arrangement step and the joining step. In the first shaping step, the fiber sheet 3S is cut into the shape of the upper and processed into the unshaped upper 3A having such a shape that it can be placed on the last 4 (see FIG. 7). The unshaped upper 3A is then placed on the last 4. The processing of the fiber sheet 3S into such a shape that it can be placed on the last 4 is for example performed with joining by sewing, without limitation thereto. Joining not by sewing but by, for example, ultrasonic waves or adhesive may also be employed. In the second shaping step, as shown in FIG. 8, the unshaped upper 3A is shaped in conformity with the shape of the last 4 by heating to obtain the shaped upper 3B. The temperature and heating time can be set as appropriate, depending on the configuration of the unshaped upper 3A. A steam heating means is used as a heating means in the second shaping step. As schematically shown in FIG. 8, for example, the unshaped upper 3A is placed in a heating box 51, and heated with high-temperature steam 52 discharged from the inner surface of the heating box 51. This steam heating allows the unshaped upper 3A to be entirely and uniformly heated. This configuration allows the unshaped upper 3A to be uniformly deformed in conformity with the shape of the last 4 to obtain the shaped upper 3B. In the second shaping step, hot-air heating, hot water heating, or the like can be used other than the steam heating. Further, the unshaped upper 3A can be heated not entirely but partially. In the sole attaching step, the shaped upper 3B is attached to a separately prepared sole by, for example, adhesive. Other than adhesive, heat fusion bonding, for example, can be applied to perform the sole attaching step simultaneously with the second shaping step.

The shoe 1 is produced through a series of the aforementioned steps. Forming a shoe tongue, trimming the wearing opening 11, making eyelets for passing shoelace therethrough, attaching decoration members and tags, printing a logo, and attaching an insole can be performed as appropriate, during any of the aforementioned steps or after all the steps. These members can be also attached by the needle-punching.

Figure 9A:
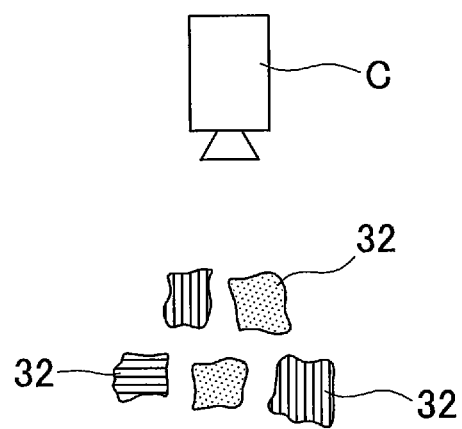
FIG. 9A is an explanatory view for a chip member identification step, regarding a method for producing the shoe.

In the case where the plurality of chip members 32 respectively have different mechanical characteristics, the producing method can include a chip member identification step. Examples of the mechanical characteristics include stiffness, thickness, compressive hardness, void volume (air permeability), and the mechanical characteristics herein correspond to various mechanical characteristics that can be evaluated by measured values. In this chip member identification step, the mechanical characteristics of each of the plurality of chip members are identified by any one of image recognition, three-dimensional measurement, and weighing. FIG. 9A illustrates an example of capturing an image using a camera C regarding the image recognition.

Figure 9B:
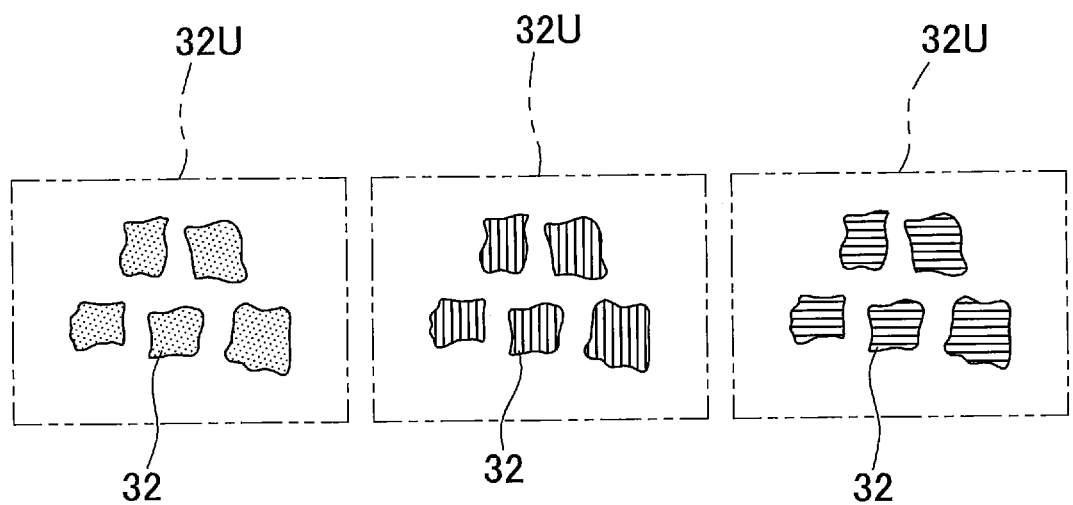
FIG. 9B is a view showing a state where the chip members are sorted, according to the method for producing the shoe.
Figure 9C:
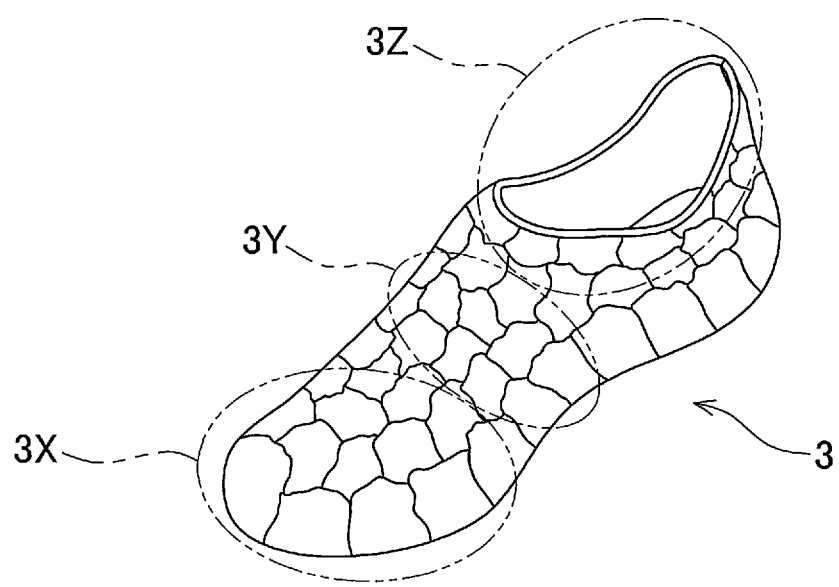
FIG. 9C is an explanatory view for the chip member arrangement step, according to the method for producing the shoe.

In the case where the producing method includes the chip member identification step, used in the joining step are, as shown in FIG. 9B, a plurality of chip member aggregates 32U, each of which is formed of an aggregate of a plurality of chip members 32 having common (or identical) or similar mechanical characteristics (illustrated with different types of hatching). Then, as shown in FIG. 9C, the plurality of chip member aggregates 32U having different mechanical characteristics are arranged on the base sheet 31 in the respective portions of the upper 3 (i.e., portions 3X, 3Y, and 3Z shown by two-dotted chain line) to make the fiber sheet 3S. The chip member identification step and the joining step enable the plurality of chip members 32 having common or similar mechanical characteristics to be formed into the chip member aggregate 32U and arranged to be distributed over each portion of the upper.

In the chip member arrangement step, the plurality of chip members 32 having common or similar mechanical characteristics may be unevenly arranged on the base sheet 31, or a plurality of chip members 32 having different mechanical characteristics are mixed together to form a chip material aggregate 32U so that chip member aggregates 32U can have different characteristics from each other.

In the case where the plurality of chip members 32 respectively have different surface shapes or different colors, an information processor (for example a personal computer, not shown) is used in the chip member arrangement step to select the plurality of chip members 32 to be arranged on the base sheet 31 and to determine the portion of the base sheet 31 on which each of the plurality of chip members 32 is to be arranged, and the plurality of chip members 32 are arranged on the base sheet 31 according to the determination. Since the plurality of chip members 32 selected by the information processor can be arranged on the respective portions of the upper 3 determined by the information processor, the shoe having a desired design can be produced.

In the case where the plurality of chip members 32 have a plurality of different kinds of appearances and a plurality of different kinds of mechanical characteristics, the plurality of chip members 32 can be joined to both sides of the base sheet 31 in the chip member arrangement step. In this case, the plurality of chip members 32 selected based on their appearances are arranged on one side of the base sheet 31, and the plurality of chip members 32 selected based on their mechanical characteristics are arranged on the other side thereof. The chip member arrangement step thus performed can impart a desired design and desired mechanical characteristics to the one side and the other side of the upper, respectively.

Figure 10:
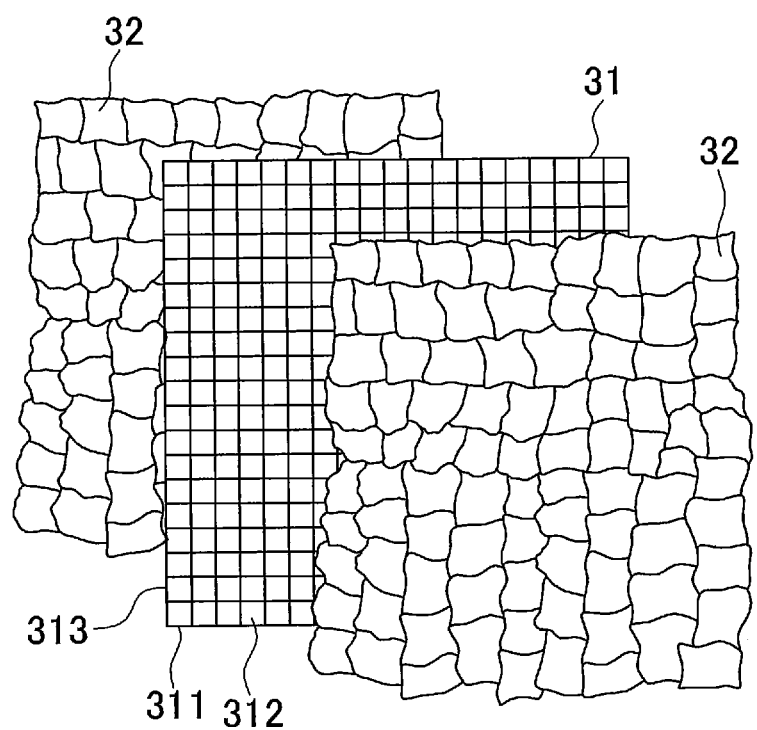
FIG. 10 is a schematic view showing a case where the chip members are joined to both sides of the base sheet.

The chip member arrangement step can include a first chip member arrangement step of arranging the plurality of chip members 32 on one side (for example a front side) of the base sheet 31, and a second chip member arrangement step of arranging the plurality of chip members 32 on the other side (for example a back side) of the base sheet 31. In this case, the joining step includes: a first joining step in which the base sheet 31 and the plurality of chip members 32, which have been subjected to the first chip member arrangement step, are integrated together by the needle punching to form a first fiber sheet; and a second joining step in which the base sheet 31 and the plurality of chip members 32, which have been subjected to the second chip member arrangement step, are integrated together by the needle punching to form a second fiber sheet (see FIG. 10). In this embodiment, the second fiber sheet is formed to share the base sheet 31 with the first fiber sheet, and the first fiber sheet and the second fiber sheet are integrally formed into a single sheet (the fiber sheet 3S) in the second joining step. However, the configuration may also be such that the second fiber sheet does not share the base sheet 31 with the first fiber sheet, and the first fiber sheet including the base sheet 31 and the second fiber sheet including another base sheet 31 are for example sewn together to form a single sheet (the fiber sheet 3S). Further in this case, a cushion material or a reinforcement material may be appropriately inserted between the base sheet 31 of the first fiber sheet and the base sheet 31 of the second fiber sheet. The chip member arrangement step and the joining step enable stable joining of the chip members to both sides of the base sheet 31.

In the case where the unshaped upper 3A includes the body part 34 located on the upper side and the bottom part 35 continuous with the lower peripheral end of the body part 34, the bottom part 35 may avoid being heated in the second shaping step. In order for the bottom part 35 to avoid being heated, for example a heat-insulating jig such as a shield or a last 4 having a heat-insulating bottom surface can be used to reduce heat applied to the bottom part 35. This configuration allows the bottom part 35 to be hardly deformed during heating. Thus, the bottom part 35 can be precisely attached to the sole 2 in the sole attaching step.

Separately from as aforementioned, in the case where the unshaped upper 3A includes the body part 34 located on the upper side and the bottom part 35 continuous with the lower peripheral end of the body part 34, a body part removing step of removing the bottom part 35 that has been heated in the second shaping step can be included after the second shaping step. In the bottom part removing step, the bottom part 35 having a shape shown on the right side of FIG. 6 is separated from the body part 34 to form a through hole (not shown) at the lower end of the shaped upper 3B. The edge of the through hole of the shaped upper 3B that has been subjected to the bottom part removing step is attached to the sole 2. The unshaped upper 3A is securely made to conform to the shape of the last 4 in the second shaping step, and thereafter the bottom part 35, which can be heat-shrunk and thereby hardened at the time of being attached to the sole 2, is removed from the shaped upper 3B, so that the shoe 1 including the sole 2 having appropriate hardness due to no influence of the heated bottom part 35 can be produced.

Even in the case where the bottom part 35 is not heated as described above, the bottom part 35 may still be hardened when adhesive is applied thereto. Thus, the bottom part removing step can be performed even in the case where the bottom part 35 is not heated.

Hereinafter, the configurations and operational effects according to the embodiment of the present invention will be summarized. Provided in this embodiment is a shoe including an upper composed of a fiber sheet, the fiber sheet including: a base sheet including yarns having heat shrinkability; and a plurality of chip members, each of which is a sheet having an area smaller than that of the base sheet, the base sheet and the plurality of chip members being layered and joined together.

This configuration allows each different characteristics to be imparted to each portion of the upper since the plurality of chip members are used and chip members to be joined vary by portion of the base sheet.

The plurality of chip members and the base sheet can be integrated together by needle punching.

This configuration can increase joining strength between the chip members and the base sheet.

The base sheet can be composed of a knitted fabric having inner gaps, or a woven fabric having inner gaps.

This configuration allows the fiber sheet constituting the upper to be easily deformed and thus easily shaped in conformity with the shape of the last, at the time of causing the upper to heat shrink for shaping.

The plurality of chip members can be arranged at least on an outer side of the base sheet of the upper.

This configuration allows the plurality of chip members to be located in the outermost layer, in which case the appearance of the upper can be changed depending on the chip members appearing in the outermost layer.

A layer including any one of a non-woven fabric, a knitted fabric, and a woven fabric can be provided on an inner side of the base sheet of the upper.

This configuration can give comfortable wearing feeling to the foot of the shoe wearer.

Each of the plurality of chip members can be composed of any one of a non-woven fabric, a knitted fabric, and a woven fabric, and made of a recycled material.

This configuration can reduce the environmental load.

The plurality of chip members can partially overlap each other to join to the base sheet.

This configuration allows the plurality of chip members partially overlapping each other to be located in the outermost layer of the upper, thereby improving the appearance of the upper. This configuration also enables stable joining of the plurality of chip members to the base sheet since the plurality of chip members overlap each other.

Provided in this embodiment is a method for producing a shoe, the method including: arranging a plurality of chip members on at least one side of a base sheet including yarns having heat shrinkability, wherein each of the plurality of chip members is a sheet having an area smaller than that of the base sheet; integrating the base sheet and the plurality of chip members by needle punching to form a fiber sheet; producing an unshaped upper by cutting the fiber sheet into a shape of the upper and processing the cut fiber sheet into such a shape for placement of the cut fiber sheet on a last, followed by placing the unshaped upper on the last; and obtaining a shaped upper by heating the unshaped upper in conformity with the shape of the last.

This configuration allows each different characteristics to be imparted to each portion of the upper since the plurality of chip members are used and different chip members to be joined vary by portion of the base sheet.

The configuration can be such that at least some of the plurality of chip members have different mechanical characteristics from each other, that the method further includes identifying the mechanical characteristics of each of the plurality of chip members by any one of image recognition, three-dimensional measurement, and weighing, and that, in integrating, a plurality of chip member aggregates, each of which is composed of a plurality of chip members having common or similar mechanical characteristics, are used and the plurality of chip member aggregates having different mechanical characteristics from each other are arranged on the base sheet in the respective portion of the upper to form the fiber sheet.

This configuration allows the plurality of chip members having common or similar mechanical characteristics to serve as the chip member aggregate and to be arranged to be distributed over each portion of the upper.

The configuration can be such that at least some of the plurality of chip members have different surface shapes or different colors from each other, and that, in the chip member arrangement step, an information processor is used to select the plurality of chip members for arrangement on the base sheet and to determine a portion of the base sheet on which each of the plurality of chip members is to be arranged, and the plurality of chip members are arranged on the base sheet according to the determination.

This configuration allows the plurality of chip members selected by the information processor to be arranged on the respective portions of the upper determined by the information processor, and thus allows a shoe having a desired design to be produced.

The configuration can be such that the plurality of chip members have a plurality of different kinds of appearances and a plurality of different kinds of mechanical characteristics, and that in the arranging, the plurality of chip members are joined to both sides of the base sheet, the plurality of chip members selected based on their appearances are arranged on one of the both sides of the base sheet, and the plurality of chip members selected based on their mechanical characteristics are arranged on the other of the both sides of the base sheet.

This configuration allows a desired design and desired mechanical characteristics to be imparted to the one side and the other side of the upper, respectively.

The configuration can be such that the arranging includes: first arranging the plurality of chip members on the one of the both sides of the base sheet; and second arranging the plurality of chip members on the other of the both sides of the base sheet, and that the integrating includes: forming a first fiber sheet by integrating by needle punching the base sheet and the plurality of chip members, which have been subjected to the first arranging; and forming a second fiber sheet by integrating by needle punching the base sheet and the plurality of chip members, which have been subjected to the second arranging.

This configuration allows the plurality of chip members to be stably joined to the both sides of the base sheet.

The present invention has been described by taking an embodiment, but the description is merely an exemplification. The shoe 1 and the method for producing the shoe 1 according to the present invention are not limited to the aforementioned embodiment. Thus, various modifications can be made for shoe 1 and the method for producing the shoe 1 according to the present invention, without departing from a gist of the present invention. The modifications include, for example, partially replacing or partially omitting a plurality of elements constituting the aforementioned embodiments, and combining an element pertaining to an embodiment with an element pertaining to another embodiment as appropriate. The modifications also include combining matters pertaining to common technical knowledge regarding the shoe 1 and the method for producing the shoe 1.

The shoe and the method for producing the shoe, of this embodiment are as described above, but the present invention is not limited to the aforementioned embodiment, and the design can be appropriately modified within the scope intended by the present invention. The operational advantages of the present invention are also not limited to the foregoing embodiments. The embodiments disclosed herein should be construed in all respects as illustrative but not limiting. The scope of the present invention is not indicated by the foregoing description but by the scope of the claims. Further, the scope of the present invention is intended to include all the modifications equivalent in the sense and the scope of the claims

What is claimed is:

1. A shoe comprising an upper composed of a fiber sheet, the fiber sheet comprising:
    an inner layer comprising a base sheet comprising yarns having heat shrinkability; and
    an outer layer comprising an aggregate of a plurality of chip members, each of which is a sheet having an area smaller than that of the base sheet and a polygonal shape or a circular shape having a side or a diameter from 10 mm to 50 mm, wherein
    the base sheet and the plurality of chip members are layered and joined together,
    exactly one of warps or wefts of the yarns of the base sheet have heat shrinkability, and
    the yarns of the base sheet have fibers knitted or woven to have distances between adjacent intersections of the fibers of 1 mm to 5 mm.

2. The shoe according to claim 1, wherein the plurality of chip members and the base sheet are integrated together by needle punching.

3. The shoe according to claim 1, wherein the plurality of chip members are arranged at least on an outer side of the base sheet of the upper.

4. The shoe according to claim 1, wherein a layer comprising any one of a non-woven fabric, a knitted fabric, and a woven fabric is provided on an inner side of the base sheet of the upper.

5. The shoe according to claim 1, wherein each of the plurality of chip members is composed of any one of a non-woven fabric, a knitted fabric, and a woven fabric, and is made of a recycled material.

6. The shoe according to claim 1, wherein the plurality of chip members partially overlap each other to join to the base sheet.

7. The shoe according to claim 2, wherein the plurality of chip members are arranged at least on an outer side of the base sheet of the upper.

8. The shoe according to claim 2, wherein a layer comprising any one of a non-woven fabric, a knitted fabric, and a woven fabric is provided on an inner side of the base sheet of the upper.

9. The shoe according to claim 3, wherein a layer comprising any one of a non-woven fabric, a knitted fabric, and a woven fabric is provided on an inner side of the base sheet of the upper.

10. The shoe according to claim 2, wherein each of the plurality of chip members is composed of any one of a non-woven fabric, a knitted fabric, and a woven fabric, and is made of a recycled material.

* * * * *